United States Patent
Johnson et al.

(10) Patent No.: US 9,286,493 B2
(45) Date of Patent: Mar. 15, 2016

(54) ENCRYPTION BRIDGE SYSTEM AND METHOD OF OPERATION THEREOF

(75) Inventors: Simon B. Johnson, Bonney Lake, WA (US); Lev M. Bolotin, Kirkland, WA (US)

(73) Assignee: ClevX, LLC, Kirkland, WA (US)

( * ) Notice: Subject to any disclaimer, the term of this patent is extended or adjusted under 35 U.S.C. 154(b) by 532 days.

(21) Appl. No.: 12/684,108

(22) Filed: Jan. 7, 2010

(65) Prior Publication Data

US 2010/0174922 A1    Jul. 8, 2010

Related U.S. Application Data

(60) Provisional application No. 61/143,155, filed on Jan. 7, 2009.

(51) Int. Cl.
  *G06F 21/80* (2013.01)
  *H04L 29/06* (2006.01)
  *G06F 21/10* (2013.01)

(52) U.S. Cl.
  CPC ............ *G06F 21/80* (2013.01); *G06F 21/10* (2013.01); *H04L 63/0428* (2013.01); *H04L 63/0442* (2013.01); *H04L 63/0823* (2013.01)

(58) Field of Classification Search
  CPC ..... G06F 21/10; G06F 21/80; H04L 63/0428; H04L 63/0823; H04L 63/0442
  USPC ............... 713/182–186, 189, 192–193, 153; 726/2, 4, 9, 20, 26–29
  See application file for complete search history.

(56) References Cited

U.S. PATENT DOCUMENTS

| | | | |
|---|---|---|---|
| 5,974,513 A | | 10/1999 | Matsuo et al. |
| 6,115,816 A | * | 9/2000 | Davis ............................. 713/153 |
| 6,547,130 B1 | | 4/2003 | Shen |
| 6,857,076 B1 | * | 2/2005 | Klein ...................... G06F 21/80 |
| | | | 713/189 |
| 7,120,251 B1 | | 10/2006 | Kawada et al. |
| 7,228,438 B2 | | 6/2007 | Bushmitch et al. |
| 7,257,714 B1 | | 8/2007 | Shen |
| 7,260,726 B1 | * | 8/2007 | Doe et al. ....................... 713/189 |
| 7,272,723 B1 | * | 9/2007 | Abbott et al. .................. 713/185 |
| 7,376,831 B2 | | 5/2008 | Kollmyer et al. |
| 7,469,302 B2 | * | 12/2008 | Whittle ................... G06F 9/542 |
| | | | 709/248 |

(Continued)

FOREIGN PATENT DOCUMENTS

| | | |
|---|---|---|
| EP | 1657645 A1 | 5/2006 |
| EP | 1982262 A1 | 8/2007 |

(Continued)

OTHER PUBLICATIONS

Supplemental European Search Report for EP application No. 06788183.9 dated Dec. 6, 2010.

(Continued)

*Primary Examiner* — Harunur Rashid
*Assistant Examiner* — Shahriar Zarrineh
(74) *Attorney, Agent, or Firm* — Ishimaru & Associates LLP

(57) ABSTRACT

A method of operation of an encryption bridge system that includes: verifying an authentication parameter using a self-authenticating encryption bridge; and controlling encryption for using the self-authenticating encryption bridge disposed between a computer system and a storage system in response to the verification including determining whether data is received from the computer system or received from the storage system.

10 Claims, 3 Drawing Sheets

(56) References Cited

U.S. PATENT DOCUMENTS

| | | | |
|---|---|---|---|
| 7,469,303 B2 * | 12/2008 | Jeong et al. | 710/5 |
| 7,536,548 B1 * | 5/2009 | Batke et al. | 713/166 |
| 7,631,195 B1 * | 12/2009 | Yu et al. | 713/189 |
| 7,783,895 B2 * | 8/2010 | Hori | G06F 21/80 380/287 |
| 8,266,378 B1 | 9/2012 | Jevans et al. | |
| 8,533,459 B2 * | 9/2013 | Candelore | H04N 7/163 380/229 |
| 8,843,768 B2 * | 9/2014 | Vogel | 713/193 |
| 2001/0008015 A1 * | 7/2001 | Vu et al. | 713/189 |
| 2001/0016895 A1 | 8/2001 | Sakajiri et al. | |
| 2001/0036109 A1 | 11/2001 | Jha et al. | |
| 2001/0056539 A1 | 12/2001 | Pavlin et al. | |
| 2002/0078361 A1 | 6/2002 | Giroux et al. | |
| 2002/0112168 A1 | 8/2002 | Filipi-Martin et al. | |
| 2003/0005336 A1 | 1/2003 | Poo et al. | |
| 2003/0128101 A1 | 7/2003 | Long | |
| 2004/0059907 A1 * | 3/2004 | Cochran et al. | 713/2 |
| 2004/0088574 A1 * | 5/2004 | Walter | H04L 63/0428 713/153 |
| 2004/0236919 A1 | 11/2004 | Okaue et al. | |
| 2005/0039027 A1 | 2/2005 | Shapiro | |
| 2005/0086497 A1 * | 4/2005 | Nakayama | 713/185 |
| 2006/0036872 A1 | 2/2006 | Yen | |
| 2006/0064604 A1 * | 3/2006 | Osaki | 713/193 |
| 2006/0198515 A1 * | 9/2006 | Forehand | G06F 21/80 380/28 |
| 2006/0204047 A1 | 9/2006 | Dave et al. | |
| 2007/0061894 A1 | 3/2007 | Skinner et al. | |
| 2007/0118745 A1 | 5/2007 | Buer | |
| 2007/0118891 A1 | 5/2007 | Buer | |
| 2007/0180270 A1 | 8/2007 | Kumagai et al. | |
| 2007/0204171 A1 * | 8/2007 | Ito | G06F 21/80 713/193 |
| 2007/0258585 A1 | 11/2007 | Sandhu et al. | |
| 2007/0258594 A1 | 11/2007 | Sandhu et al. | |
| 2008/0107275 A1 * | 5/2008 | Asnaashari | G06F 21/80 380/281 |
| 2008/0126813 A1 * | 5/2008 | Kawakami | G06F 21/72 713/193 |
| 2008/0130959 A1 | 6/2008 | Kim | |
| 2008/0141022 A1 * | 6/2008 | Hu | G06F 21/602 713/153 |
| 2008/0219449 A1 * | 9/2008 | Ball et al. | 380/277 |
| 2008/0229118 A1 * | 9/2008 | Kasako | G06F 21/80 713/193 |
| 2009/0006863 A1 * | 1/2009 | Mizuno | 713/190 |
| 2009/0097653 A1 | 4/2009 | Dahlerud | |
| 2009/0125726 A1 * | 5/2009 | Iyer et al. | 713/189 |
| 2009/0144361 A1 | 6/2009 | Nobakht et al. | |
| 2009/0199004 A1 | 8/2009 | Krawczewicz et al. | |
| 2009/0220088 A1 | 9/2009 | Lu et al. | |
| 2009/0327757 A1 * | 12/2009 | Kito et al. | 713/193 |
| 2010/0049993 A1 | 2/2010 | Okaue et al. | |
| 2010/0235575 A1 | 9/2010 | Yasaki et al. | |
| 2010/0257377 A1 * | 10/2010 | Ejiri et al. | 713/193 |
| 2011/0060921 A1 * | 3/2011 | Michael | G06F 11/1456 713/192 |
| 2011/0113255 A1 | 5/2011 | Kuster et al. | |
| 2011/0296238 A1 * | 12/2011 | Abzarian et al. | 714/16 |
| 2011/0307724 A1 * | 12/2011 | Shaw et al. | 713/323 |
| 2011/0314279 A1 | 12/2011 | Ureche et al. | |

FOREIGN PATENT DOCUMENTS

| | | |
|---|---|---|
| WO | 0042491 A1 | 7/2000 |
| WO | 2005017758 A1 | 2/2005 |

OTHER PUBLICATIONS

U.S. Appl. No. 12/652,035, filed Jan. 4, 2010, Johnson, et al.

IEEE, "Authoritative Dictionary of IEEE Standards Terms", "Authoritative Dictionary of IEEE Standards Terms", Dec. 2000, pp. 219-221, vol. 7th ed, Publisher: IEEE.

* cited by examiner

ENCRYPTION BRIDGE SYSTEM AND METHOD OF OPERATION THEREOF

CROSS-REFERENCE TO RELATED APPLICATION(S)

This application claims the benefit of U.S. Provisional Patent Application Ser. No. 61/143,155 filed Jan. 7, 2009, and the subject matter thereof is incorporated herein by reference thereto.

The present application contains subject matter related to co-pending U.S. patent application Ser. No. 12/652,035 filed Jan. 4, 2010. The related application is assigned to ClevX, LLC and the subject matter thereof is incorporated herein by reference thereto.

TECHNICAL FIELD

The present invention relates generally to mass storage devices, and more specifically to an apparatus and method of controlling encryption between a host computer system and a mass storage device.

BACKGROUND ART

A critical issue with almost all aspects of computer system and mobile electronic device use, including portable memory storage, is security. This also applies to electronic products containing memory storage as an integral part of the design. For example, digital cameras, MP3 players, smart phones, palm computers, gaming devices, etc., that may have confidential information residing in memory. Whether it is an email account, financial information or corporate data, a user must be authenticated in order to gain access to this information.

Encryption is typically the means to hide sensitive information. It is a complex process that hides data so that it cannot be interpreted until a correct decryption key is used to decode the data. A computer is generally used to access data in internal as well as external mass storage devices. Data is encrypted prior to storing and decrypted upon retrieval.

Encryption, provided by a computer, consumes system resources whether the encryption is applied to internal or external storage devices. Thus, the computer requires higher performance hardware to reduce system burden. A better solution is to put the burden of encryption on the mass storage device to free up computer resources. It then becomes a simple matter of connecting the mass storage device to the computer with no complex formatting and partitioning required on the computer end.

There are few self-encrypting mass storage devices on the market. If a user already has a mass storage device, the user must either purchase a new self-encrypting drive or purchase encryption software for the user's computer. Self-encrypting drives are typically more expensive than their non-encrypting counterparts.

An encryption bridge may be used to connect a computer with an external mass storage device reduces the burden on computer resources and is more cost effective than purchasing multiple self-encrypting drives but allows access to secured data just by having possession of the encryption bridge.

Solutions to these problems have been long sought but prior developments have not taught or suggested any solutions and, thus, solutions to these problems have long eluded those skilled in the art.

DISCLOSURE OF THE INVENTION

The present invention provides a method of operation of an encryption bridge system that includes: authenticating a user using a self-authenticating encryption bridge; and controlling encryption using the self-authenticating encryption bridge disposed between a computer system and a storage system in response to the authenticating of the user.

The present invention further provides an encryption bridge system that includes: a self-authenticating encryption bridge for authenticating a user, the self-authenticating encryption bridge disposed between a computer system and a storage system; and an encryption control module connected to the user input module for controlling encryption between the computer system and the storage system in response to authentication of the user.

Certain embodiments of the invention have other aspects in addition to or in place of those mentioned above. The aspects will become apparent to those skilled in the art from a reading of the following detailed description when taken with reference to the accompanying drawings.

BEST MODE FOR CARRYING OUT THE INVENTION

Figure 1:
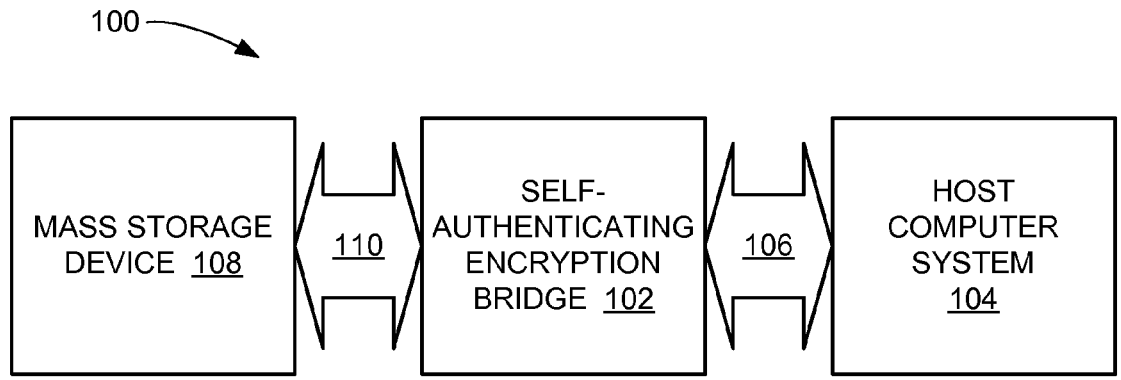
FIG. 1 is a block diagram of the components of an encryption bridge system in accordance with an embodiment of the present invention.

The following embodiments are described in sufficient detail to enable those skilled in the art to make and use the invention. It is to be understood that other embodiments would be evident based on the present disclosure, and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

Likewise, the drawings showing embodiments of the apparatus/device are semi-diagrammatic and not to scale and, particularly, some of the dimensions are for clarity of presentation and are shown greatly exaggerated in the drawing FIGs.

Similarly, the drawings generally show similar orientations of embodiments for ease of description, but this is arbitrary for the most part. Generally, the various embodiments can be operated in any orientation.

Referring now to FIG. 1, therein is shown a block diagram of the components of an encryption bridge system 100 in accordance with an embodiment of the present invention. The encryption bridge system 100 is composed of a self-authenticating encryption bridge 102 connected to a host computer system 104 on an unencrypted or a clear data communication channel 106 and to a storage system such as a mass storage device 108 on an encrypted data channel 110.

The host computer system 104 sends unencrypted data to the self-authenticating encryption bridge 102. The data is intended to be stored on the mass storage device 108. The self-authenticating encryption bridge 102 encrypts the data and forwards it on to the mass storage device 108.

Likewise, the mass storage device 108 sends data to the self-authenticating encryption bridge 102 intended to be received by the host computer system 104. The self-authenticating encryption bridge 102 decrypts the data and forwards it on to the host computer system 104.

The self-authenticating encryption bridge 102 remains locked until an authorized user has been authenticated. The users must interact with the self-authenticating encryption bridge 102 in order to validate themselves as authorized users and enable the encryption/decryption process.

If the self-authenticating encryption bridge 102 is unable to authenticate the user, encrypted data is sent directly to the host computer system 104 where it will be useless because the host computer system 104 will not be able to decipher the encrypted data from the mass storage device 108.

Figure 2:
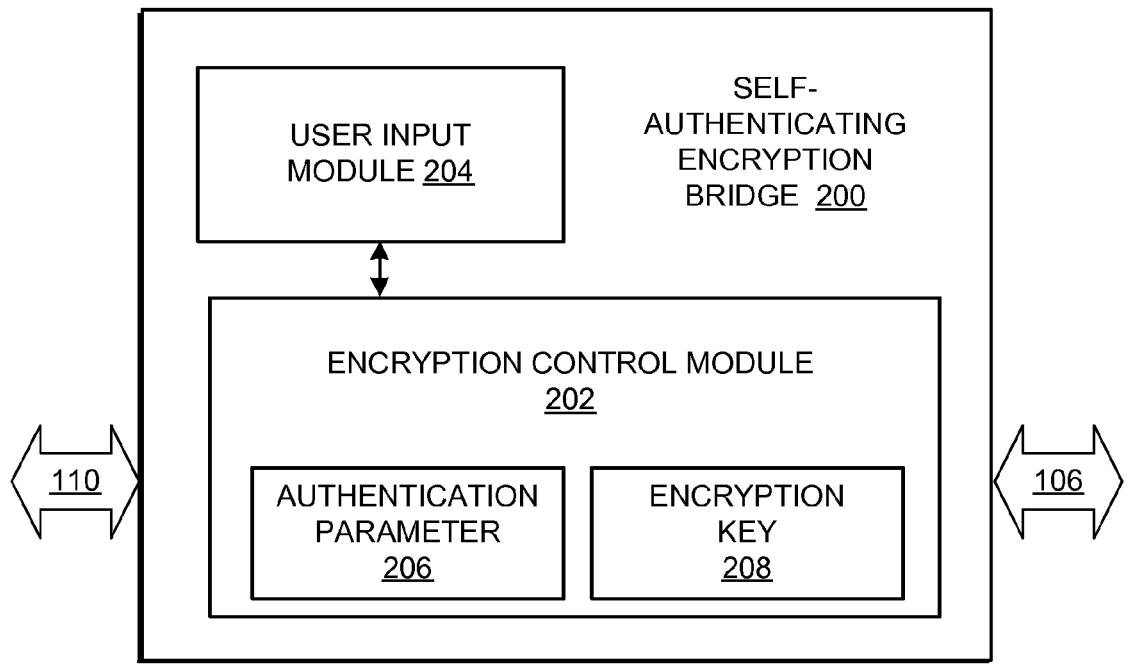
FIG. 2 is a block diagram of a self-authenticating encryption bridge in accordance with a further embodiment of the present invention.

Referring now to FIG. 2, therein is shown a block diagram of a self-authenticating encryption bridge 200 in accordance with a further embodiment of the present invention. The self-authenticating encryption bridge 200 is a bridge than can be used to identify one or more users and is composed of two modules: an encryption control module 202 and a user input module 204.

Within the encryption control module 202 is an authentication parameter module 206 for releasing an encryption key in an encryption key module 208.

The user must identify himself or herself by entering authentication information using the user input module 204. Then, the encryption control module 202 verifies a user's identity against authentication parameters in the authentication parameter module 206.

If the user is authenticated, the encryption control module 202 uses the encryption key in the encryption key module 208 to encrypt data moving from the host computer system 104 of FIG. 1 through the clear data communication channel 106 to the mass storage device 108 of FIG. 1 through the encrypted data channel 110. The encryption control module 202 also uses the encryption key in the encryption key module 208 to decrypt data moving from the mass storage device 108 to the host computer system 104.

The user input module 204 supplies the authentication interface between the user and the encryption control module 202. For example, the user input module 204 may consist of a series of buttons, that when pushed in certain order by a user, allow the encryption control module 202 to authenticate the user. In one embodiment, the series of numerical buttons allows a user to enter a personal identification number (PIN), which can then be compared against a PIN, which is one of the numbers stored in the authentication parameter module 206.

The user input module 204 is used herein as a general term that encompasses any number of human input mechanisms that can interact with the user. Examples of these mechanisms are:

Buttons—for entering a series of numbers like an ATM machine

Thumb-wheel—for entering a series of numbers like a combination lock

Fingerprint reader—for receiving and analyzing a user's fingerprint (or other biometric based input devices)

RF module—for receiving an authentication signal from a key fob.

The above is exemplary and not intended to be limiting.

Figure 3:
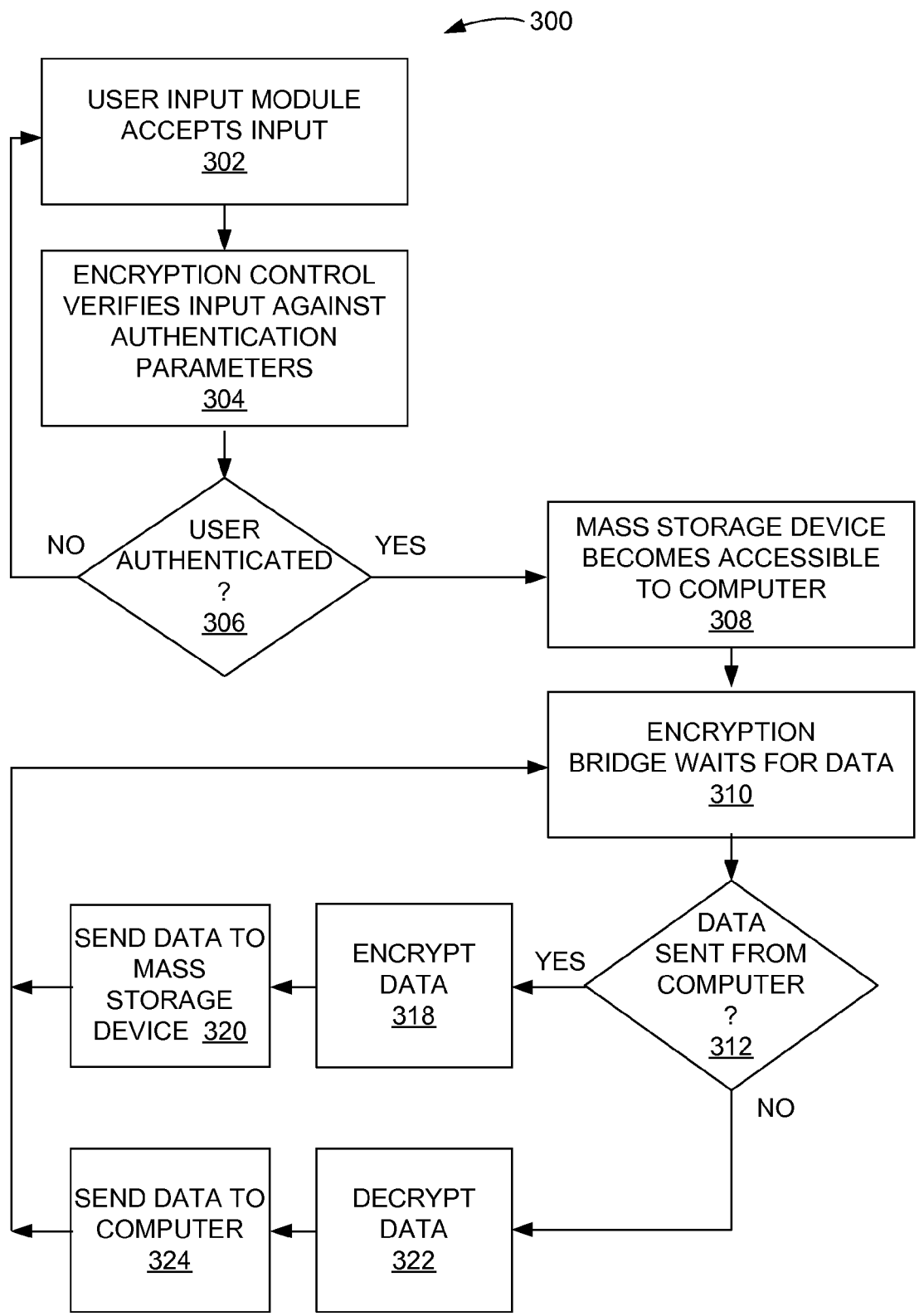
FIG. 3 shows a flow chart of a method for validating a user and transferring data in accordance with a still further embodiment of the present invention.

Referring now to FIG. 3, therein is shown a flow chart 300 of a method for validating a user and transferring data in accordance with a still further embodiment of the present invention. The data flows between the mass storage device 108 and the host computer system 104 of FIG. 1.

The method starts when the user input module accepts input from a user in a block 302. From the above list of mechanisms, this can be a combination, PIN, fingerprint, etc. The encryption control module then verifies data sent from the user input module and compares this with an authentication parameter in the authentication parameter module in a block 304.

A check is then made to determine if the authentication parameter matches those supplied by the user in a decision block 306. If YES, the encryption control module enables the encryption/decryption process and the mass storage device becomes accessible by the host computer system in a block 308. If NO, the self-authenticating encryption bridge remains locked and the method returns to user input module accepts input in the block 302.

The self-authenticating encryption bridge waits for data sent either from the host computer system or the mass storage device in a block 310. Once the self-authenticating encryption bridge receives data, a decision is made if the data was sent from the host computer system in a decision block 312.

If data is received from the host computer system, the self-authenticating encryption bridge encrypts the data in a block 318 and sends the encrypted data on to the mass storage device in a block 320. If data is received from the mass storage device, the self-authenticating encryption bridge decrypts the data in a block 322 and sends it on to the host computer system in a block 324.

From the block 320 or 324, the method returns to the self-authenticating encryption bridge waits for data in the block 310.

Figure 4:
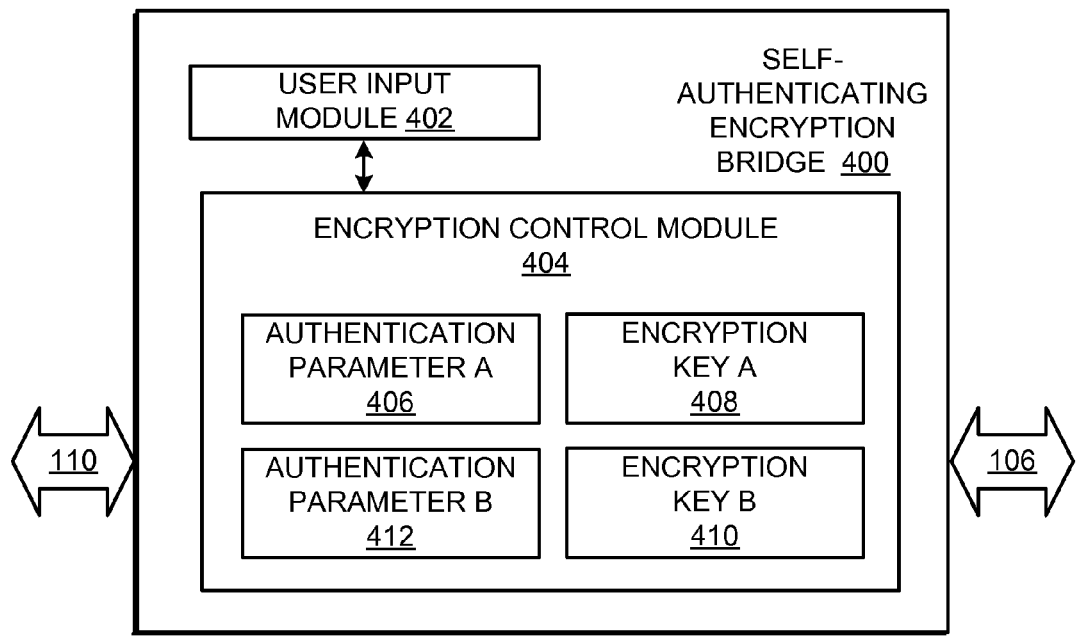
FIG. 4 shows a block diagram of a self-authenticating encryption bridge with multiple encryption keys in accordance with an additional embodiment of the present invention.

Referring now to FIG. 4, therein is shown a block diagram of a self-authenticating encryption bridge 400 with multiple encryption keys in accordance with an additional embodiment of the present invention.

In the self-authenticating encryption bridge 400, a user may enter a first code, PIN A, in a user input module 402 for an encryption control module 404. The PIN A is associated with an authentication parameter A module 406. After a user is authenticated, the self-authenticating encryption bridge 400 is unlocked and an encryption key A module 408 allows access to an encryption key A available for the encryption/decryption process. An encryption key B module 410 remains inaccessible.

Likewise, a user may enter the PIN B to unlock the self-authenticating encryption bridge 400. The PIN B is associated with an authentication parameter B module 412. After the user is authenticated, the self-authenticating encryption bridge 400 is unlocked and the encryption key B module 410 allows access to an encryption key B to be used for the encryption/decryption process. The encryption key A module 408 remains inaccessible.

In this manner, a single self-authenticating encryption bridge may support multiple encryption keys for multiple users and multiple mass storage devices.

Another embodiment includes an encryption control module containing a single encryption key associated with multiple authentication parameter modules. In this embodiment, multiple users with different codes may access the same mass storage device.

Figure 5:
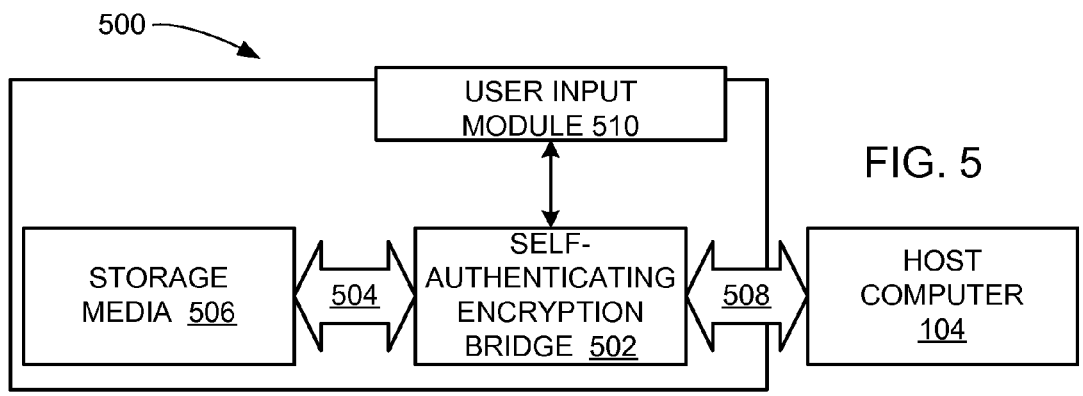
FIG. 5 is a block diagram of a mass storage device with an integrated self-authenticating encryption bridge in accordance with a further additional embodiment of the present invention.

Referring now to FIG. 5, therein is shown a block diagram of a mass storage device 500 with an integrated self-authenticating encryption bridge 502 in accordance with a further additional embodiment of the present invention.

The integrated self-authenticating encryption bridge 502 is housed within the same package as the mass storage device 500. An encrypted data channel 504 is internal to the mass storage device 500 and connects internally with a storage media 506. A clear data channel 508 connects the integrated self-authenticating encryption bridge 502 to the host computer system 104.

A user input module 510 is integral with the package of the mass storage device 500. Since the integrated self-authenticating encryption bridge 502 is embedded within the mass storage device 500, the user input module 510 is placed so codes may be entered from outside the mass storage device 500. Thus, all possible modes of user input, as discussed in FIG. 2, are made available for the mass storage device 500.

Figure 6:
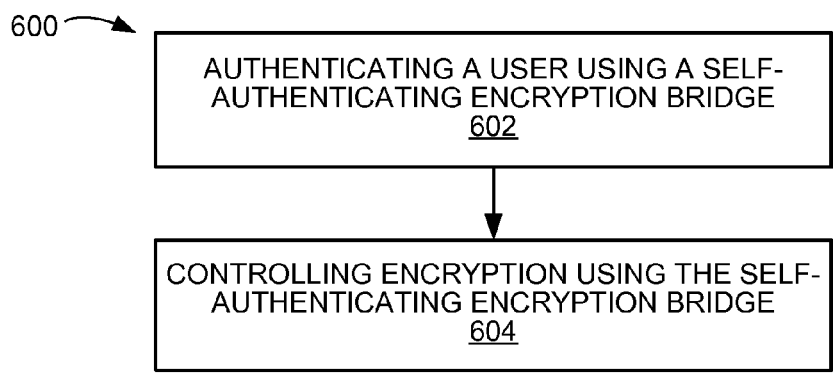
FIG. 6 is a flow chart of a method of operation of an encryption bridge system in a further embodiment of the present invention.

Referring now to FIG. 6, therein is shown a flow chart of a method 600 of operation of an encryption bridge system 100 in a further embodiment of the present invention. The method 600 includes: authenticating a user using a self-authenticating encryption bridge in a block 602; and controlling encryption using the self-authenticating encryption bridge disposed between a computer system and a storage system in response to the authenticating of the user in a block 604.

Various embodiments of the present invention include the following aspects:

An encryption bridge system including:
providing a computer connected by way of a communication channel to the self-authenticating encryption bridge;
a mass storage device connected by way of a communication channel to the self-authenticating encryption bridge; and
a self-authenticating encryption bridge that encrypts data sent from the computer to the mass storage device and decrypts data sent from the mass storage device to the computer after a user has been authenticated.

A self-authenticating encryption bridge including:
a user input module for verifying user identity;
an encryption control module;
a communication channel for transferring clear data to the computer; and
a communication channel for transferring encrypted data to the mass storage device.

A self-authenticating encryption bridge as described above further including:
authentication parameters for authenticating a user; and
encryption key(s) used for encrypting/decrypting data.

A self-authenticating encryption bridge as described above further including: a user input module capable of accepting keyed or manipulable input.

A self-authenticating encryption bridge as described above further including: a user input module capable of accepting biometric input.

A self-authenticating encryption bridge as described above further including: a user input module capable of accepting RF transmission input.

A self-authenticating encryption bridge as described above further including: an encryption control module that prevents data on the mass storage device from being accessed until the user has been validated by analyzing parameters sent from the user input module.

A self-authenticating encryption bridge as described above further including: an encryption control module containing multiple pairs of decryption keys and authentication parameters.

A self-authenticating encryption bridge as described above further including: an encryption control module containing a single encryption key associated with multiple authentication parameters.

A self-authenticating encryption bridge as described above further including: an encryption control module containing a single encryption key associated with multiple authentication parameters.

A self-authenticating encryption bridge as described above further including: a self-authenticating encryption bridge embodied in and integral to the mass storage device.

A self-authenticating encryption bridge as described above further including: a self-authenticating encryption bridge embodied in and integral to the communication channel (e.g. cable and/or connectors and/or casing).

A self-authenticating encryption bridge as described above further including: a self-authenticating encryption bridge embodied in and integral to the output connector on the computer.

A self-authenticating encryption bridge as described above further including: an encrypted channel and a clear channel composed of termination points capable of plugging directly into a mass storage device and computer without the use of additional cables.

A self-authenticating encryption bridge as described above further including: wireless communication used for either or both the encrypted and clear communication channels.

A self-authenticating encryption bridge as described above further including: a power source that may be derived from the communication channel or an internal source.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A method of operation of an encryption bridge system comprising:
providing power for a self-authenticating encryption bridge from a communication channel or within the self-authenticating encryption bridge;
providing multiple authentication parameters for authenticating multiple users in the self-authenticating encryption bridge;
providing multiple encryption keys for encrypting clear data in the self-authenticating encryption bridge for multiple partitions in a storage system;
verifying the authentication parameters using the self-authenticating encryption bridge, the self-authenticating encryption bridge includes a human input mechanism for receiving input;
controlling encryption for using the self-authenticating encryption bridge disposed between a computer system and the storage system in response to the verification including:
unlocking an encryption/decryption process based on the verification, receiving data to the self-authenticating encryption bridge, identifying a source of the data received by the self-authenticating encryption bridge for controlling encryption/decryption, the source includes a storage system source or a computer system source, and decrypting the data received from the storage system to the computer system for storage on the computer system based on the storage system source;

transferring the clear data to the computer system over a first communication channel from the self-authenticating encryption bridge; and transferring encrypted data to the storage system over a second communication channel from the self-authenticating encryption bridge.

2. The method as claimed in claim 1 further comprising:
providing the self-authenticating encryption bridge for preventing the data on the storage system from being accessed until the verification.

3. The method as claimed in claim 1 further comprising:
operating a user input module in the self-authenticating encryption bridge to enter a user authentication code, a biometric input, a radio frequency transmission input, or a combination thereof.

4. The method as claimed in claim 1 further comprising:
providing the self-authenticating encryption bridge integral to the storage system, the communication channel, termination points on the communication channel, an output connector on a computer, or a combination thereof.

5. The method as claimed in claim 1 further comprising:
using a wireless communication channel to connect the self-authenticating encryption bridge into the encryption bridge system.

6. An encryption bridge system comprising:
a self-authenticating encryption bridge for verifying authentication parameters, the self-authenticating encryption bridge having multiple of the authentication parameters for authenticating multiple users in the self-authenticating encryption bridge, multiple encryption keys for encrypting clear data in the self-authenticating encryption bridge for multiple partitions in a storage system, and a human input mechanism for receiving input, the self-authenticating encryption bridge disposed between a computer system and the storage system, and the self-authenticating encryption bridge is for controlling encryption in response to the verification including:

unlocking an encryption/decryption process based on the verification, receiving data to the self-authenticating encryption bridge, identifying a source of the data received by the self-authenticating encryption bridge for controlling encryption/decryption, the source includes a storage system source or a computer system source, and decrypting the data received from the storage system to the computer system for storage on the computer system based on the storage system source;

a first communication channel from the self-authenticating encryption bridge for transferring the clear data to the computer system;

a second communication channel from the self-authenticating encryption bridge for transferring encrypted data to the storage system; and a source of power for providing the power for the self-authenticating encryption bridge from a communication channel or within the self-authenticating encryption bridge.

7. The system as claimed in claim 6 wherein:
the self-authenticating encryption bridge includes an encryption control module for preventing the data on the storage system from being accessed until the verification.

8. The system as claimed in claim 6 wherein:
the human input mechanism is for entering a user authentication code, a biometric input, a radio frequency transmission input, or a combination thereof.

9. The system as claimed in claim 6 wherein:
the self-authenticating encryption bridge is integral to the storage system, the communication channel, termination points on the communication channel, an output connector on a computer, or a combination thereof.

10. The system as claimed in claim 6 further comprising:
a wireless communication channel for connecting the self-authenticating encryption bridge into the encryption bridge system.

* * * * *